United States Patent
Aurora

(10) Patent No.: US 6,260,433 B1
(45) Date of Patent: Jul. 17, 2001

(54) LUBRICATING DEVICE FOR TELESCOPIC SHAFT AXIAL CONDUITS FORMED IN ITS RELATIVELY SLIDABLE TUBULAR PARTS

(75) Inventor: Igino Aurora, Miglianico (IT)

(73) Assignee: Eurocardan S.p.A., Atessa (IT)

( * ) Notice: Subject to any disclaimer, the term of this patent is extended or adjusted under 35 U.S.C. 154(b) by 0 days.

(21) Appl. No.: 09/487,345

(22) Filed: Jan. 19, 2000

(30) Foreign Application Priority Data

Jan. 28, 1999 (IT) ............................................. RM99A0065

(51) Int. Cl.[7] ...................................................... B62D 1/18
(52) U.S. Cl. ............................ 74/493; 74/492; 184/105.1
(58) Field of Search ....................... 74/492, 493; 184/5, 184/5.1, 100, 105.1

(56) References Cited

U.S. PATENT DOCUMENTS 3,698,259 * 10/1972 Reeves ..................................... 74/492
4,667,530 * 5/1987 Mettler et al. .......................... 74/493
5,243,874 * 9/1993 Wolfe et al. ............................ 74/493
5,383,811 * 1/1995 Campbell et al. ...................... 74/493
6,149,526 * 11/2000 Boersma et al. ....................... 74/493

* cited by examiner

Primary Examiner—David A. Bucci
Assistant Examiner—Chong H. Kim
(74) Attorney, Agent, or Firm—Browdy and Neimark

(57) ABSTRACT

The present invention relates to a lubricating device for telescopic shaft with axial conduits formed in the relatively sliding tubular parts, with conformal profile. It comprises a lubricating sleeve in the inner tubular part connected, internally thereto, to a grease distributor element integrally movable with the same inner tubular part, inside the outer tubular part. The inner and outer tubular parts comprise axial conduits between their opposite surfaces. The distributor element presents two segments, one stably inserted in the inner tubular part, the other one able to slide with reduced play in the inner profile of the outer tubular part. Inside the distributor element a passage of the grease to the axial conduits is obtained.

6 Claims, 4 Drawing Sheets

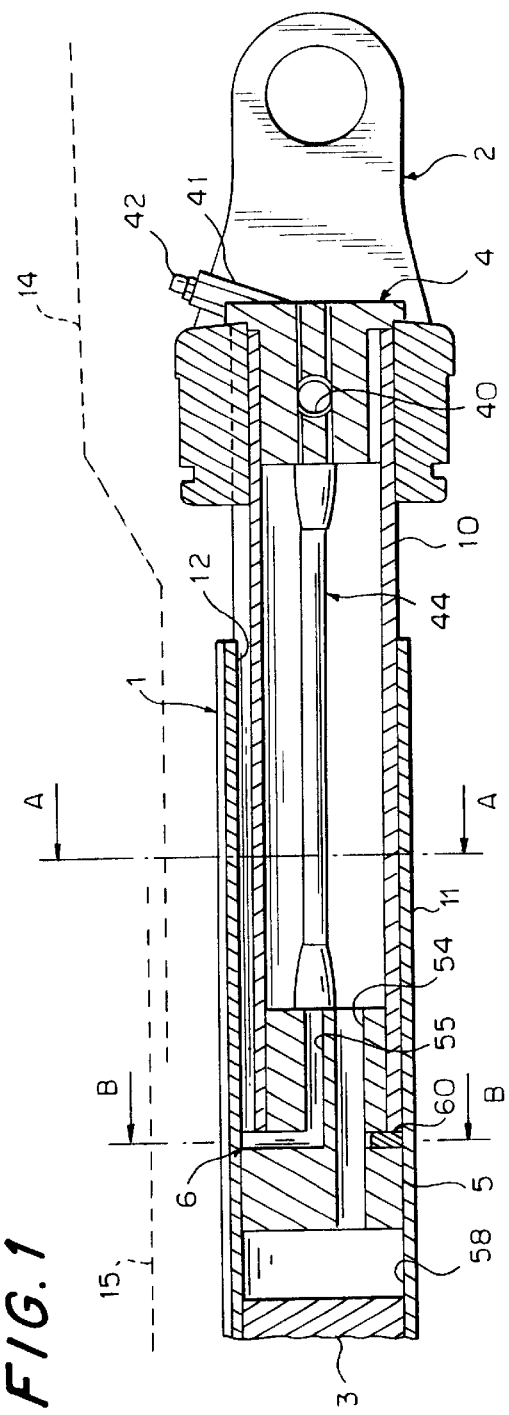
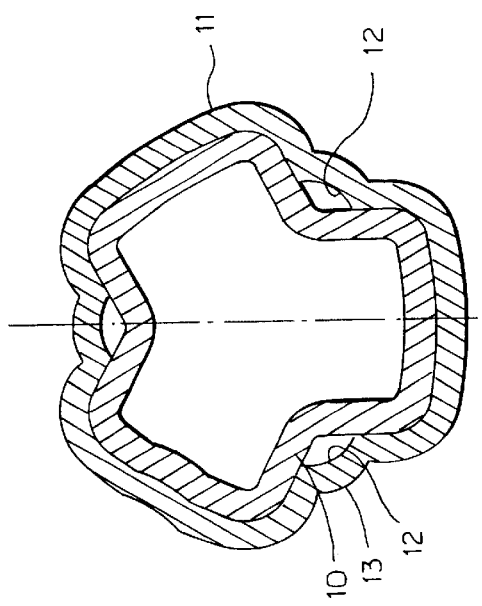
FIG.1
FIG.2

LUBRICATING DEVICE FOR TELESCOPIC SHAFT AXIAL CONDUITS FORMED IN ITS RELATIVELY SLIDABLE TUBULAR PARTS

BACKGROUND OF THE INVENTION

The present invention relates to a lubricating device for telescopic shaft with axial conduits formed in its relatively sliding tubular parts. The telescopic shaft is, in particular, a cardanic shaft for transmitting power from a force outlet of an agricultural tractor to an operating machine or driven tool.

In general, the cardanic shaft comprises an intermediate shaft made of two tubular parts bearing, at the respective free extremities, a fork for cardanic joint or the like. The tubular parts of the intermediate shaft, an outer one and an inner one, have conformal profiles in order to be able to slide relatively one inside the other, but are prevented from rotating relative to one another. The cardanic shaft can adapt itself to the mutual displacements of the tractor and of the operating machine or driven tool thanks to the mutual displacements of the tubular parts which allow it to be lengthened and shortened.

This lengthening and shortening adaptation takes place under a generally high transmission torque and hence generates friction on the contact surfaces of the tubular parts of intermediate shaft. The consequences thereof are heating and wear of the aforesaid parts, with obvious consequences of a reduced working life due to defects and breakages.

Lubricating devices mounted on a cardanic shaft have already been realized, with the aim of avoiding the assembling and re-assembling operations which would be necessary for the periodic lubrication of the inner surface of the outer tubular part or of the outer surface of the inner tubular part.

Among others, Italian patent No. 1,286,359 by the same applicant discloses a lubricating device for telescopic shaft, comprising a ball greaser mounted in the fork of the inner tubular part of the telescopic shaft and connected, internally thereto, with a small connecting tube to an element for the storage and distribution of the grease, positioned inside the inner tubular part and having an inner cavity communicating, through its own openings and corresponding through holes obtained in the inner tubular part, with the inner surface of the outer tubular part of the intermediate shaft.

Thus, such a device is able from the exterior to let the grease arrive between the inner and outer tubular portions of a telescopic tube without disassembling any component of the transmission. However, since the play or inter-space between the two tubular parts of the telescopic shaft is relatively small, generally ranging between 0.5 and 0.9 mm, the grease, due to its viscosity, is not able to flow axially in that inter-space, except for a few centimeters. This is due to the fact that resistance to sliding increases extremely rapidly, so that the operator with a manual injector is no longer able to pump grease into the interior. Thus, the quantity of grease that enters the inter-space between the two tubular parts of the telescopic shaft is so small as to cover a very reduced surface area relative to the area of actual sliding, with the consequence of an insufficient lubrication.

On the other hand, if a motorized lubricating apparatus were to be used, whence grease exits at a sufficiently high pressure for an effective diffusion in that inter-space, such pressure could jeopardize the soundness of the couplings in the connecting tube, which is usually made of plastic material.

Moreover, even if the connecting pipe were made for high pressures, motorized lubricating apparatuses may periodically not be available in place.

SUMMARY OF THE INVENTION

The aim of the present invention therefore is to eliminate the aforementioned drawbacks, in order to obtain an effective lubrication of the surfaces of the two tubular parts in mutual sliding contact.

The invention, as it is characterized by the claims that follow, solves the problem of providing a lubricating device for telescopic shaft with axial conduits formed in the relatively sliding tubular parts, with conformal profile, in particular of a cardanic shaft for the transmission of power from a force outlet of an agricultural tractor to a driven tool; lubricating device comprising a greaser in the inner tubular part connected, internally thereto, to a grease distributor element movable integrally with the same inner tubular part, inside the outer tubular part, which from a general point of view is characterized in that:

said internal and external tubular parts, inserted one inside the other, able relatively to slide but prevent from mutually rotating, comprise, between the outer surface of the inner tubular part and the inner surface of the outer tubular part, axial conduits;

said greaser is contained in a lubricating sleeve, fastened to one extremity of said inner tubular part;

said distributor element comprises two segments, said first segment stably inserted in said inner tubular part at the extremity opposite the one that receives the lubricating sleeve, said second segment able to slide with reduced play in the inner profile of the outer tubular part; in said first distributor element segment being obtained a central passage continuing a pipe connecting with said greasing sleeve, radial passages, internally communicating with said central passage, in continuation of the attachment junction, and externally, through outlet ports with the inlets of said axial conduits not covered by said inner tubular part.

BRIEF DESCRIPTION OF THE DRAWINGS

Further features and advantages of the invention shall be made more readily apparent from the detailed description that follows, of a preferred embodiment illustrated purely by way of non limiting indication in the accompanying drawings, in which:

FIG. 1 shows a longitudinal section of a telescopic shaft with lubricating device according to the present invention.

FIG. 2 shows a first embodiment of the tubular parts of the telescopic shaft section by itself according to the line A—A of FIG. 1.

DESCRIPTION OF THE PREFERRED EMBODIMENTS

Figure 3:
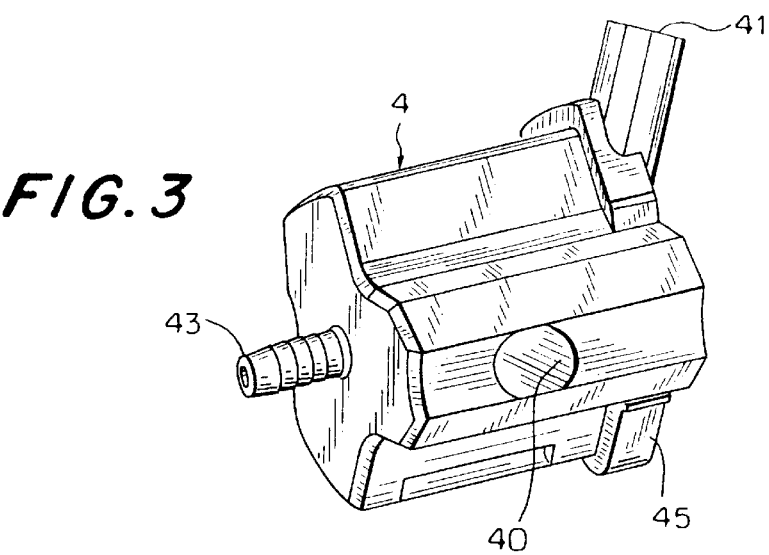
FIG. 3 shows an axonometric view of a sleeve with greaser of the telescopic shaft of FIG. 1.

In accordance with the present invention, in FIG. 1 an intermediate telescopic shaft, in particular of cardanic shaft is indicated in its entirety with the reference number 1. The intermediate shaft 1 is made in two coaxial tubular parts, an inner one 10 and an outer one 11, bearing, at the respective free extremities, a fork for a cardanic joint or the like (FIG. 1 shows a fork 2, associated to the inner tubular part 10, at whose other extremity a plug portion 3 is shown). The telescopic shaft 1 is inside a protective sheath, schematically represented by the dotted lines 14, 15.

Figure 11:
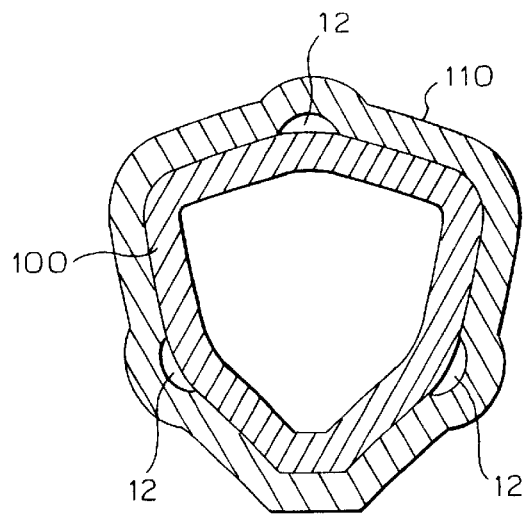
FIG. 11 shows a second embodiment of the tubular parts of the telescopic shaft sectioned by itself according to line A—A of FIG. 1.
Figure 12:
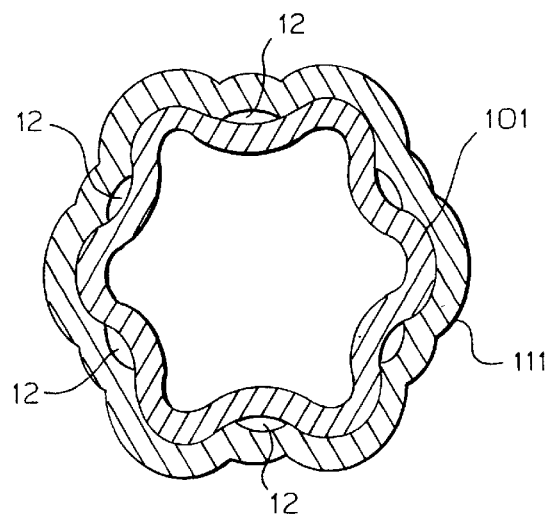
FIG. 12 shows a third embodiment of the tubular parts of the telescopic shaft sectioned by itself according to line A—A of FIG. 1.

The inner and outer tubular parts 10, 11 of the intermediate shaft 1 are inserted one inside the other, able to slide relative to each other but prevented from mutually rotating. For this purpose, the inner and outer tubular parts must have sections with conformal profile, for instance three-lobed as in a first embodiment shown in FIG. 2, or pentagonal as in those indicated as 100 and 110 in a second embodiment shown in FIG. 11, or with sinusoidal profile like those indicated as 101 and 11 in a third embodiment shown in FIG. 12. It should be clear that other profiles for tubular parts may be adopted, as long as the allow for the mutual sliding without mutual rotation thereof According to the present invention, between the outer surface of the inner tubular part 10 and the inner surface of the outer tubular part 11, in addition to the normal play or inter-space which allows the correct relative sliding, conduits generically indicated as 12 are formed. In all the embodiments indicated above, such conduits 12 are represented as obtained by means of non homologous curvatures between the two tubular parts (generally between two successive ridges, as in FIGS. 2 and 12) towards the exterior of portions of the outer tubular part 11. It should be mentioned that, just like the conduits 12 shown in the illustrated embodiments are obtained as protuberances of the section of the outer tubular profile, as those indicated with 13 in FIG. 2, so similar conduits, although not shown herein, can be obtained with recesses obtained in the section of the inner tubular part 10. The function of these conduits, explained in detail hereafter, is to allow the axial diffusion of the grease.

In correspondence with the fork 2, on the inner tubular part 10 of the telescopic shaft 1 is fastened a lubricating sleeve 4 by means of an elastic pin provided in a through hole 40. The elastic pin also renders the inner tubular part 10 integral to the fork 2. On the sleeve 4 is provided a greaser 41, complete with ball valve 42 for coupling with a greasing injector (not shown herein). As shown in FIG. 3, the sleeve 4 has a three-lobed profile identical to that of the cavity of the inner tubular part 10. Thus, the sleeves (not shown) for the tubular parts of the second and third embodiment (FIGS. 11 and 12) have corresponding profiles. The sleeve 4 presents a check border 45 and appropriate rounded edges 12 in the opposite face.

Figure 4:
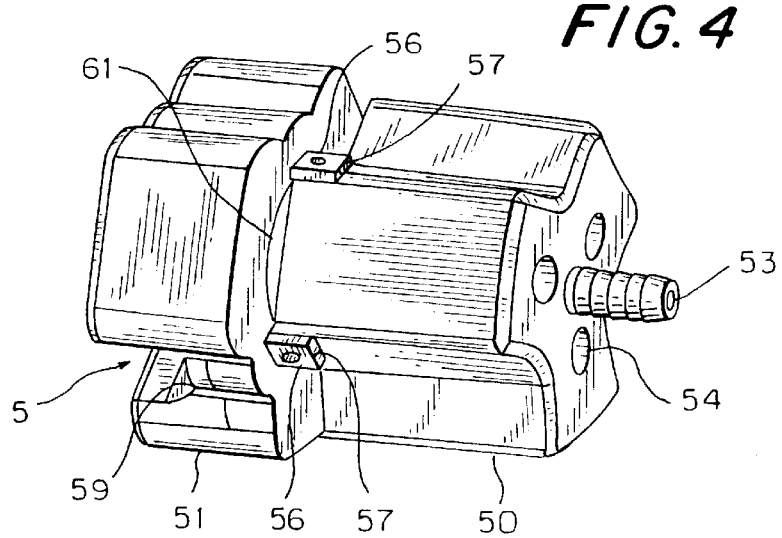
FIG. 4 shows an axonometric view of a first embodiment of grease distributor element of the telescopic shaft of FIG. 1.
Figure 7:
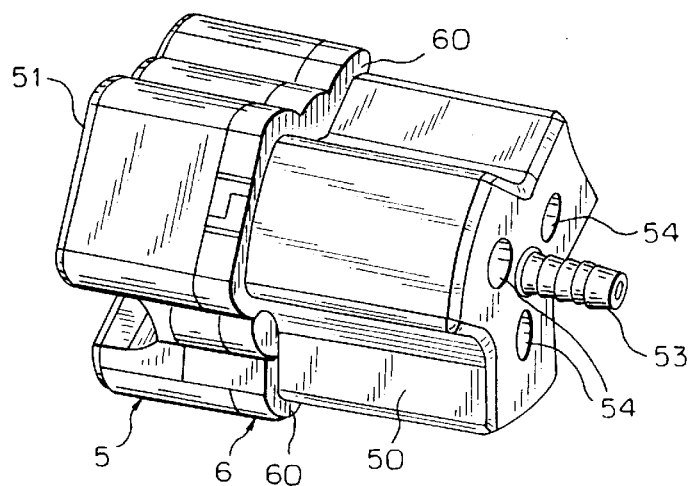
FIG. 7 shows an axonometric view of a grease distributing element, complete with diaphragm, of the telescopic shaft of FIG. 1.

From the greaser 41, inside the sleeve 4, is obtained a passage (not shown) for the grease which leads to an attachment junction 43 for a connecting tube 44. The connecting tube 44, which can be made of plastic material of suitable length, at its other extremity is joined to a corresponding attachment junction 53 of a grease distributor element 5, a first embodiment whereof is shown in FIGS. 4 and 7. The connecting tube is positioned coaxially to the central axis of rotation of the telescopic shaft 1 to reduce the stresses produced by the centrifugal force.

The distributor element 5 comprises two segments 50, 51, with three-lobed or similar profile. In particular, the first segment 50, with rounded edges, is dimensionally made to be inserted with forced coupling into the inner tubular part 10 at the opposite extremity from the one that receives the lubricating sleeve 40. The segment 50 hermetically closes the inner tubular part 10.

The second segment 51 of the distributor element 5 has a profile shaped in a manner complementary to the inner profile of the outer tubular part 11, but with sufficient play to allow it to slide therein.

Figure 8:
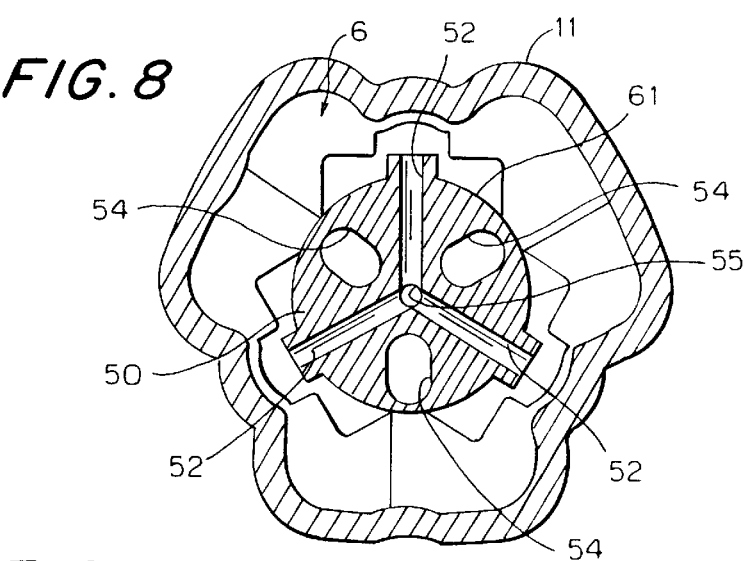
FIGS. 8 and 9 show the telescopic shaft of FIG. 1 in sections obtained according to line B—B, respectively in a first and in a second position of the diaphragm.
Figure 9:
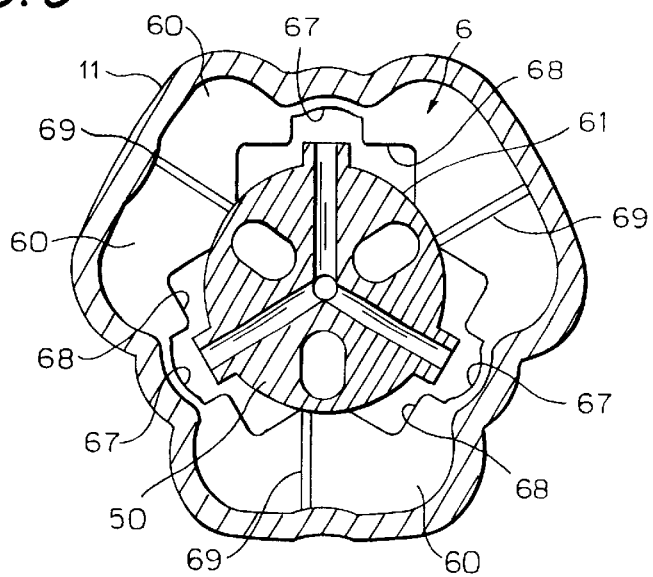

As shown in FIGS. 8 and 9, inside the distributor element 5 are obtained radial passages, generically indicated as 52 and axial passages, generically indicated as 54.

The radial passages 52 communicate internally with a central passage 55, in continuation of the attachment junction 53, and externally with the conduits 12 obtained axially between the mutually opposite surfaces of the inner and outer tubular parts.

For this purpose, the outlet ports of the radial passages 52 are maintained free, thanks to the fact that they are provided on projections 56 (FIG. 4) having surfaces 57 which serve to check the extremity of the inner tubular part 10, thereby preventing the further insertion of the distributing element 5 into the inner tubular part 10 and hence the covering of those ports.

The axial passages 54 extend over the entire length of the distributor element 5 and place in communication the inner cavity of the inner tubular part 10 with a compartment 58 of the outer tubular part 11 lying between the distributor element 5 and the plug 3. The function of the axial passages 54 shall be described hereafter.

In the segment 51 of the distributor element 5 is further provided a slot 59 to prevent it from impacting a pin which connects the outer tubular part 11 with a fork (not shown in the drawings).

According to a first embodiment of the distributing element 5, a diaphragm 6 is associated thereto, said diaphragm being formed by multiple screen elements 60 able to be coupled consecutively, which are inserted about a substantially cylindrical portion 61 lying between the segment 50 and the segment 51 of the distributing element 5. In the drawings (FIGS. 1, 7 and 9) they are shown in the number of three, but a different number is possible.

Figure 5:
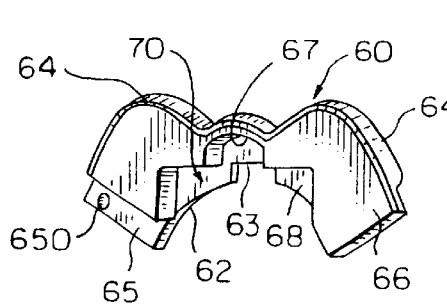
FIGS. 5 and 6 show axonometric views, from one side and, respectively, from the other, of a shielding element of the diaphragm of the telescopic shaft of FIG. 1.
Figure 6:
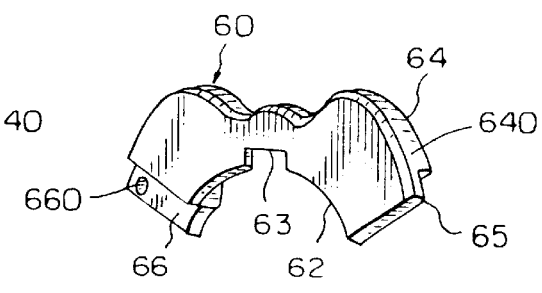

Reference is made to FIGS. 5 and 6, which show a screen element 60 seen from one side and, respectively, from the other. The screen element 60 internally has a circumference arc profile 62 destined to be housed on the cylindrical portion 61 of the distributing element 5, radially held by the segments 50 and 51. The arc profile 62 is interrupted by a squared slot 63 able to overlie, with adequate play, a projection 56 without covering the outlet port of a passage 52. The screen element 60 externally has an outer profile shaped, as a gull wing, like the inner profile of the outer tubular part 11 in its first embodiment, and dimensionally such as to slide therein with a certain play, also thanks to appropriate chamfers 640, for the purposes which shall be explained in detail hereafter.

For the assembly in succession, each screen element 60 narrows, at the respective extremities, into complementary fins 65, 66, half as thick and oriented in mutually opposite directions. In this way a fin 65 of a screen element 60 of the diaphragm 6 can be coupled with the complementary fin 66 of the consecutive screen element. For this purpose a fin 65 presents a projection 650 destined to be engaged by superposition and slight pressure (once placed in its cylindrical portion seat 61 in the present embodiment) in a corresponding recess 660 of a complementary fin 66. In this way, the screen elements mounted in succession are integral with the distributing element 5 (FIG. 7). However, since the projections 650 have an ample coupling with the respective recesses 660, and as stated previously, the dimensions of the screen elements allow them a certain radial play within the outer tubular part, the screen elements 60 are capable of effecting a relative displacement between two positions. One position is the one shown in FIG. 8 in which the diaphragm 6, with its screen elements 60, adheres to the distributing element 5, in contact with the cylindrical portion 61; whilst in the other position, shown in FIG. 9, the diaphragm 6 adheres to the inner profile of the outer tubular part 11 and the screen elements are mutually distanced with a play indicated as 69.

Each screen element 60 presents, after mounting, a junction cavity 70 (FIG. 5) oriented towards the lubricating sleeve 4, in which a dome 67 and, at its sides, angular rims 68 are present. This particular shape of the junction cavity 70 shall be explained hereafter.

The operation of the lubricating device for telescopic shaft according to the invention is as follows. When grease is pumped by means of a manual injector applied to the valve 42 of the lubricating sleeve 40, the grease advances from the attachment junction of the sleeve 40 through the connecting pipe 44 until reaching the attachment junction 53 of the distributing element 5. Thence, through the central passage 55 it branches radially through the radial passages 52 until it reaches the outlet ports located n the projections 56. The grease is taken to the screen elements 60 of the diaphragms 6. The thrust of the grease on the relatively movable screen elements displaces radially outwards the screen elements 60 in the position shown in FIG. 9. The outer profile 64 of the screen elements 60 perfectly adheres to the inner profile of the outer tubular part 11. This contributes to close any escape routes for the grease. Through the rims 68 and the domes of their junction cavities 70, the grease is axially taken into the conduits 12 between the inner and outer tubular parts 10, 11. Thence it is easy for it to be spread circumferentially, also thanks to the relative motion between the inner and outer tubular parts.

It is apparent that the grease finds less resistance in passing into the conduits than through the screen elements 60 and thence into the normal, and thus reduced, inter-space between the outer profile of the segment 51 of the distributing element 5 and the inner profile of the outer tubular part 11. The viscosity of the grease should be kept in mind. The presence of the screen elements is particularly advantageous when the resistance to the diffusion of the grease increases due to the presence of very long segments to be lubricated.

Once the lubrication operation is complete, the screen elements 60 are brought back to their collected position shown in FIG. 8. This is favored by the small chamfers 640 obtained on their outer profile (FIGS. 5 and 6), which bring back the screen elements 60 with their profile 62 in contact with the cylindrical portion 61 of the distributing element 5. This is important, because if the screen elements 60 were to remain with their outer profile always in contact with the inner profile of the outer tubular part, during the relative motion of the two parts, they would serve as scrapers of the grease meatus, thereby frustrating the lubricating operation.

The grease, whether new or already worn, which should overcome the distributing element would pass into the compartment 58 of the outer tubular part 11; thence through the axial passages 54 it would return towards the sleeve 4 and therefrom it would exit through passages (not shown herein) in proximity with the fork 2. It should be mentioned that there is no possibility for the grease returning from the compartment 58 to be mixed with the new grease fed by the lubricating sleeve 4.

Figure 10:
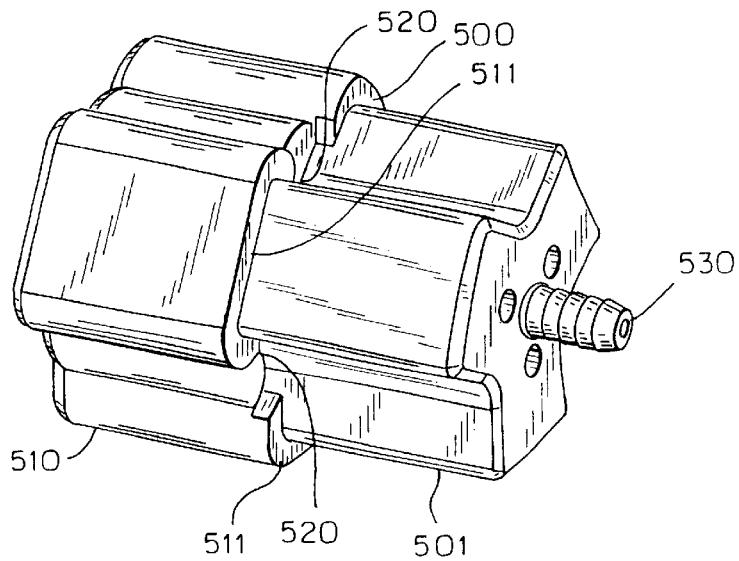
FIG. 10 shows an axonometric view of a second embodiment of grease distributor element of the lubricating device according to the present invention.

FIG. 10 shows a second embodiment of distributing element, indicated in its entirety as 500, comprising a first segment 501 provided with attachment junction 530 and a second segment 510. In this embodiment, the segment 501 is substantially identical to the one of the first embodiment, whilst the segment 510 presents axially protruding projections 511, serving, with their radial surfaces, as checking elements for the inner tubular part 10 of a telescopic shaft 1 similar to that of FIG. 1. The axially protruding projections 511 are circumferentially interrupted by recesses delimiting in plan view the output ports of related radial outlet passages 520, similar to those indicated as 52 in the distributing element 5.

It is readily apparent that the lubricating device using the distributing element 500 is constructively simpler and therefore more economical, although the axial blow-by of the grease is prevented solely by the sealing capacity of the mutually opposite profiles of the segment 510 and of the inner profile of the outer tubular part 11. It can be convenient when the segments to be lubricated are not particularly long.

The invention thus conceived may be subject to numerous modifications and variations, without thereby departing from the scope of the inventive concept. Moreover, all components can be replaced with technically equivalent elements.

What is claimed is:

1. A lubricating device in a telescopic shaft with axial conduits formed in the relatively slidable tubular parts including an inner tubular part and an outer tubular part with conformal profile, lubricating device comprising a greaser in the inner tubular part connected, internally thereto, to a grease distributing element able to move integrally with the same inner tubular part, within the outer tubular part, wherein said inner and outer tubular parts, inserted one inside the other, relatively able to slide but prevented from mutually rotating, present, between the outer surface of the inner tubular part and the inner surface of the outer tubular part, axial conduits;

said greaser is contained in a lubricating sleeve, fastened to an extremity of said inner tubular part;

said distributing element comprises two segments, said first segment stably inserted in said inner tubular part at the opposite extremity to the one that receives the lubricating sleeve, said second segment being able to slide with reduced play in the inner profile of the outer tubular part; in said first segment of distributing element being obtained a central passage in continuation to a pipe connecting with said lubricating sleeve, radial passages, communicating internally with said central passage, in continuation of an attachment junction, and externally, through outlet ports with the inlets of said axial conduits not covered by said inner tubular part.

2. A device according to claim 1, wherein said distributor element comprises at least an axial through bole which places a compartment in communication, said compartment lying between said distributing element with a plug for closing said outer tubular part, and the inner cavity of the inner tubular part.

3. A device according to claim 1, wherein to said distributing element is associated a diaphragm formed by multiple screen elements able to be coupled consecutively, destined to be inserted about a cylindrical portion lying between said first segment and said second segment of the distributing element; said screen elements relatively movable between a first position of adherence with the outer profile of said inner tubular part and a position of adherence with the inner profile of said outer tubular part presenting a junction cavity between said outlet ports of the radial passages to said axial conduits.

4. A device according to claim 1, wherein said inner and outer tubular parts have three-lobed profile.

5. A device according to claim 1, wherein said inner and outer tubular parts have pentagonal profile.

6. A device according to claim 1, wherein said inner and outer tubular parts have sinusoidal profile.

* * * * *